United States Patent [19]

Zucker

[11] 4,098,673
[45] Jul. 4, 1978

[54] METHOD AND APPARATUS FOR REMOVING COLLOIDAL SUSPENSIONS FROM A LIQUID

[75] Inventor: Jerry Zucker, Lake Como, Fla.

[73] Assignee: Hudson Pulp & Paper Corp., New York, N.Y.

[21] Appl. No.: 795,537

[22] Filed: May 10, 1977

Related U.S. Application Data

[63] Continuation-in-part of Ser. No. 688,029, May 19, 1976, abandoned.

[51] Int. Cl.² .......................... C02C 5/12; B03C 5/00; C25B 1/02
[52] U.S. Cl. .................................... 204/302; 204/149; 204/167; 204/180 R; 204/186; 204/299 R; 204/277; 210/44
[58] Field of Search .................. 204/149, 152, 180 R, 204/186, 275, 277, 167, 269, 299, 302; 210/44, 50

[56] References Cited

U.S. PATENT DOCUMENTS

| | | | |
|---|---|---|---|
| 1,559,035 | 10/1925 | Egloff et al. | 204/302 X |
| 3,247,091 | 4/1966 | Stuetzer | 204/302 X |
| 3,356,603 | 12/1967 | Drew | 204/167 |
| 3,398,082 | 8/1968 | Lochmann et al. | 204/302 |
| 3,412,002 | 11/1968 | Hubby | 204/302 X |
| 3,479,281 | 11/1969 | Kikindai et al. | 204/149 X |
| 3,718,556 | 2/1973 | Rohrback | 204/149 |
| 3,766,050 | 10/1973 | Pados | 204/302 |
| 3,798,150 | 3/1974 | Gilchrist | 204/302 X |

*Primary Examiner*—Arthur C. Prescott
*Attorney, Agent, or Firm*—Harold L. Stults; Pasquale A. Razzano

[57] ABSTRACT

A system and method for removing colloidal suspensions or particles from a liquid, in particular tall oil soap particles from black liquor of a wood pulping process. Black liquid is moved along a flow path from an upstream to a downstream zone. First and second electrical conductors are respectively located in the upstream and downstream zones and means are provided for applying opposite electrical potentials to these conductors. For removal of anionic colloids, the first conductor is made positive and the second conductor negative. Thus, colloidal particles in the liquid having a relative potential opposite to the potential of the first conductor are attracted towards the first conductor as the liquid flows through the upstream zone, and some of the ions attached to some of these particles are stripped off by the electrical field, leaving these particles with a potential of the opposite polarity from particles not so affected. The stripped colloidal particles attract other colloidal particles the charge of which has not been changed by stripping, thereby commencing the formation of agglomerates. As a result of the continuous pressure from the flow, and of air introduced into the stream and a small amount of hydrogen and oxygen resulting from electrolysis of the water present, these agglomerates or globules are "washed off" the conductors into a separation vessel wherein there results a separation in the phases. Improved agglomeration is achieved by also applying pulsating potentials to the conductors and by insulating both conductors so that, in addition to the electric field between them, there are separate electric fields between each of them and ground.

37 Claims, 8 Drawing Figures

METHOD AND APPARATUS FOR REMOVING COLLOIDAL SUSPENSIONS FROM A LIQUID

This application is a continuation-in-part of U.S. patent application Ser. No. 688,029 filed May 19, 1976 now abandoned, the disclosure of which is incorporated herein by reference.

The present invention relates to a method and apparatus for improved collection of particles which exhibit a relative potential, such as for example cationic or anionic resins, particulate or fiber suspensions, and in particular to a method and apparatus for recovering anionic tall oil soap particles from black liquor produced from wood pulping processes.

In the wood pulping industry, tall oil soap in the black liquor obtained from pulp digesters via the pulp washers and/or the evaporators is typically recovered by skimming off the tall oil soap particles which float on the surface of the liquor as a scum. However, additional or residual tall oil soap remains dispersed in fine particles within the skimmed black liquor and is usually lost when that liquor is burned to recover soda values.

The matter of residual tall oil in skimmed liquor has long been a matter of concern for the pulp industry. A residual of 0.7%, based on black liquor solids (also commonly referred to as BLS), has historically been established as an acceptable value. Aside from a smaller dissolved fraction, this residual is a result of minute soap particles which remain suspended in the black liquor. Because of their small size, the rate that these soap particles rise through the liquor is so slow that, under normal retention conditions in skimming tanks, the particles never make it to the top to be skimmed off and thus are lost when the liquor is burned. Since the rate of ascent of these particles is approximately proportionate to the square of their radius, in accordance with Stokes Law, it would be advantageous if these minute particles could be agglomerated into larger particles so that retention time in the skimming tanks could be reduced and so that the total amount of remaining colloidal suspension can be reduced substantially below that conventionally attainable. Thus, it is an object of this invention to agglomerate these minute particles.

It is another object of the present invention to recover additional tall oil soap from the black liquor.

Another object of the present invention is to recover tall oil soap from the black liquor of pulping processes by a relatively simple and inexpensive process and apparatus.

A still further object of the present invention is to cause agglomeration of tall oil soap particles in black liquor so that the particles will float to the surface of the liquor for removal by skimming or other processes.

A still further object of the present invention is to improve collection of colloidal or otherwise suspended particles in a liquid that exhibit a colloidal charge or zeta potential, in the liquid.

The use of electricity to achieve a reduction in tall oil residuals in black liquor has been attempted in the past, for example by Drew as disclosed in U.S. Pat. No. 3,356,603. In that system a corona discharge is produced above the surface of the black liquor. However, the voltage required to produce an electric field that would to any significant degree alter the rate of migration of soap particles, even one foot beneath the liquor's surface, is manyfold the arcing potential of the required field. Thus before the desired high field gradient is achieved, arcing would be induced which, for all practical purposes, reduces the instantaneous field to zero.

Drew also suggested putting the black liquor in a tank in direct contact with two electrodes, apparently after first treating the black liquor in a corona discharge step. However the voltage applied is less than that necessary to induce the decomposition of water with the result that there is essentially no response whatsoever in reducing the residual tall oil content of the black liquor.

In accordance with an aspect of the present invention, tall oil soap particles from black liquor are agglomerated in an apparatus including an elongated conduit providing a flow path for the black liquor and having upstream and downstream zones. First and second electrical conductors are respectively located in the upstream and downstream zones, and a positive electrical potential is applied to the first conductor while a negative potential is applied to the second conductor. In the upstream zone ahead of the first electrode, means are provided to introduce air into the stream and to agitate the stream vigorously by a beater.

This invention takes advantage of the "charge-like" colloidal nature of the tall oil soap particles, commonly referred to as zeta potential, and reduces the repulsive forces of electric origin between the suspended particles, or ever reverses the polarity of some of the particles, to produce attractive forces such that the minute colloidal particles agglomerate into larger particles which will have a much greater rate of ascent in the skimming tank. By the arrangement of the apparatus of the present invention the anionic tall oil soap particles in the liquor are attracted towards the first conductor as liquid flows through the upstream zone and some of the particles are stripped of a portion of their negative anions so that they exhibit a positive charge and thus attract other, unstripped particles to themselves. The particles then pass with the liquor to the downstream zone wherein any excess positively charged particles are attracted to the negatively charged second conductor to induce further agglommeration while any excess positive charge is neutralized. The flow of black liquor through openings in the second conductor continually washes the agglomerated particles off the conductor, and the liquor and particles flow into a skimming tank where the agglomerated particles float to the surface of the tank for removal, e.g. by skimming, or sink to the bottom and are decanted as in the case of denser agglomerates. The conductors are charged with relatively fixed potentials, but it has been found that substantially improved agglomeration will occur if, in addition to the D. C. base field a pulsating potential is superimposed thereon.

This process is also adaptable to other liquids and particles, particularly particles which exhibit a relative cationic potential, as opposed to the anionic potential of tall oil, are to be removed the polarity of the first and second conductors is reversed.

The above, and other objects, features and advantages of this invention will be apparent in the following detailed description of an illustrative embodiment thereof which is to be read in connection with the accompanying drawings wherein:

Figure 1:
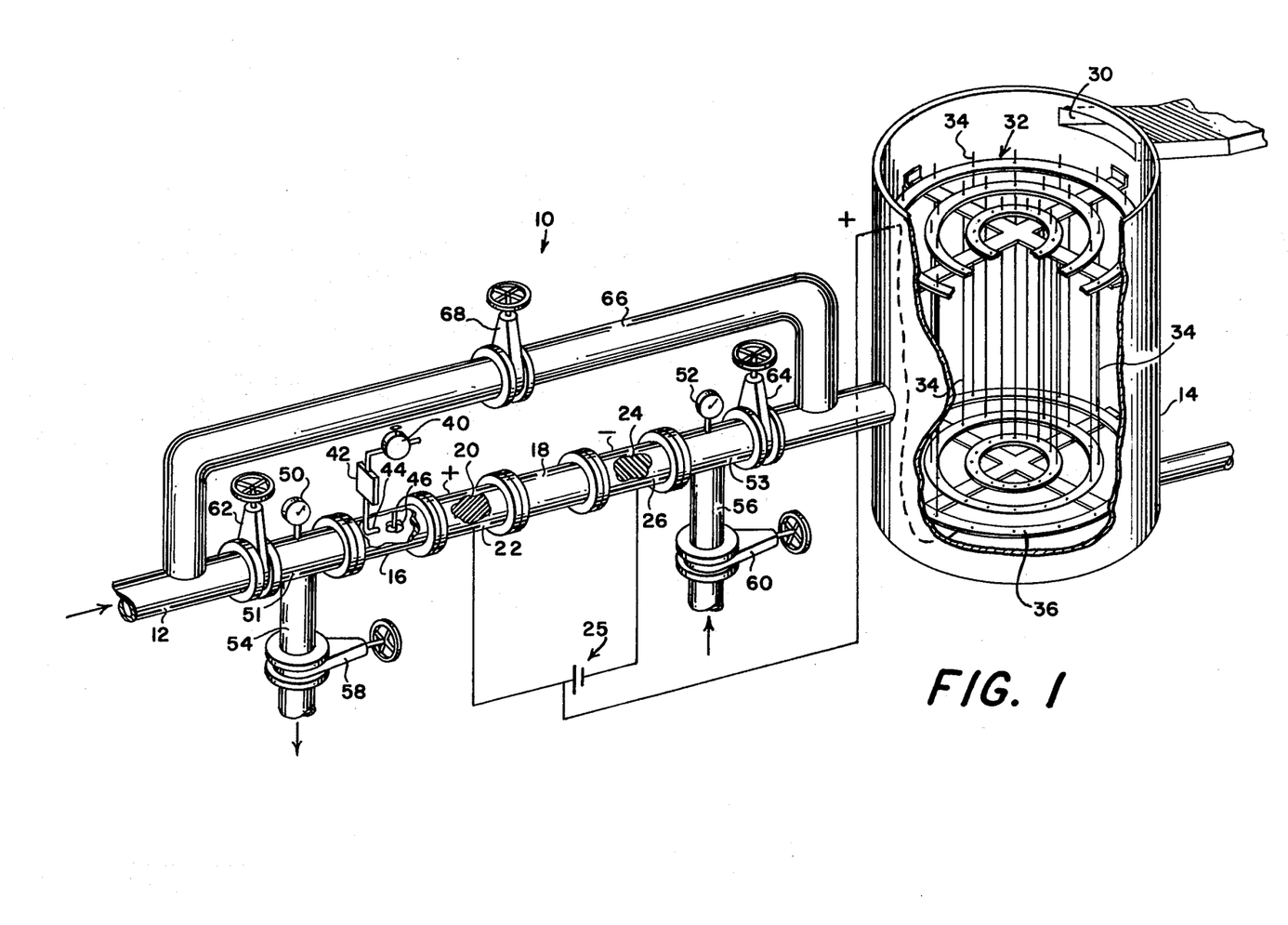
FIG. 1 is a perspective view of a system constructed in accordance with the present invention.

Referring now to the drawings in detail, and initially to FIG. 1 thereof, a system 10 for improved collection of particles, and in particular tall oil soap particles such as exist in the black liquor obtained from wood pulping processes, is illustrated. As seen therein, the black liquor is supplied from the pulp washers or evaporators (not shown) to a conduit 12 which defines a flow path from the evaporators or pulp washers to a collection tank 14 or the like. Conduit 12 is formed of a plurality of pipe sections, including a pair of pipe sections 16, 18, which are formed of an electrically nonconductive material that is resistant to high temperatures. Such materials can take a variety of forms, and it has been found that pipe sections formed of synthetic materials sold under the trademarks "Kynar" or "FRP" are satisfactory, as are most fiberglass materials.

Figures 2, 3:
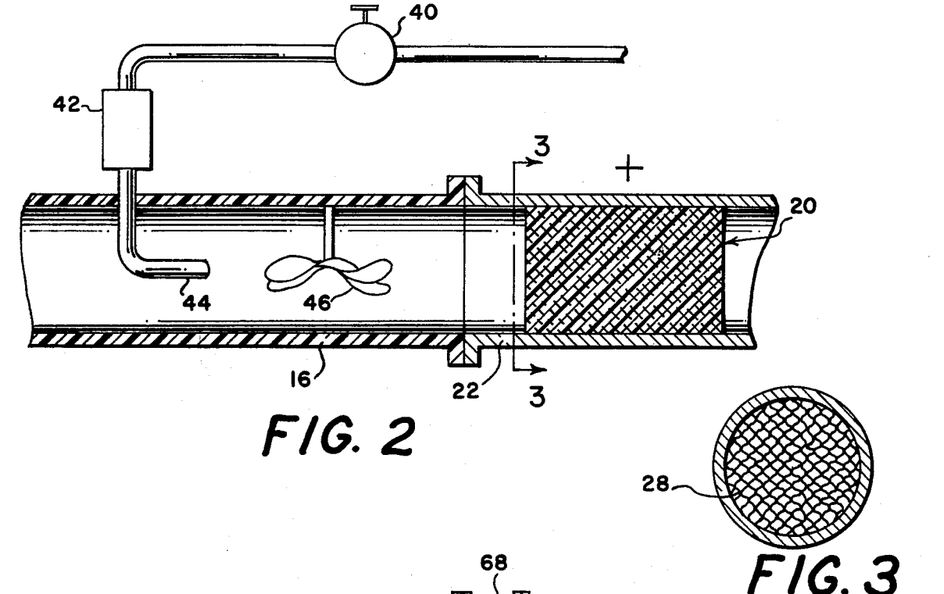
FIG. 2 is an enlarged sectional view of a portion of the flow path of the system of FIG. 1.
FIG. 3 is a sectional view taken along line 3—3 of FIG. 2.

Pipe section 18 divides conduit 12 into upstream and downstream zones through which the black liquor flows. A first conductor 20 is located within a pipe section 22, between insulator sections 16, 18, in the upstream zone while a second conductor 24 is located in a pipe section 26 in the downstream zone. These conductors may take a variety of forms, such as wire mesh grids, spaced graphite sheets, or simply a series of individual wires spaced within their associated pipe sections. However it has been found that a suitable conductor is formed from conventional packing material used in a variety of different applications. This packing material is illustrated in FIGS. 2 and 3, and consists of a plurality of layers of corrugated conductive sheet material. The adjacent layers are positioned at an angle to each other and secured together at the intersection of the apices of their corrugations. In this manner a series of individual flow paths are formed through the packing body or conductor. One such packing material is the Koch-Sulzer packing and is available from the Koch Engineering Company.

Opposite electrical potentials are connected to each of the conductors 20, 24, as illustrated in FIG. 1, in any conventional manner. In the illustrative embodiment of the invention wherein tall oil soap particles are to be removed from the black liquor, the first conductor 20 is connected to a positive potential while the second conductor 24 is connected to a negative potential. The source of the potential may be a rectifier, battery, generator, or constant current source, as schematically indicated at 25 in the drawing. A constant current source is preferred. Due to process variations, the conductivity of the liquor varies somewhat. A canstant current source (commercially available) adjusts the voltage up or down automatiacally to maintain a proper current density.

Figure 5:
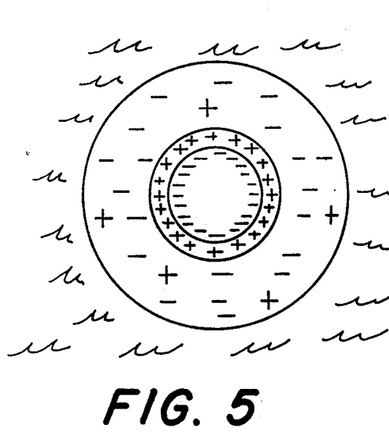
FIG. 5 is a diagrammatic view of a typical anionic colloid.

The tall oil soap particles to be removed by the apparatus are colloidal in nature and, as with nearly all colloidal particles in a solution containing free ions, have a tendency to attract either positive or negative ions present in the solution to their surface. Most such colloids are negatively "charged"; that is they have ions held on their surfaces by relatively weak hydrogen bonding or "field bonds", as shown diagrammatically in FIG. 5. The surface ions, depending on their nature, impart a marked tendency for the particles in suspension to migrate toward either a positive or negative field. The qualitative measurement of this tendency is referred to as "Zeta" potential. The greater these charges, the greater are the particles' inter-repulsion and therefore the greater the "Brownian" stability; and the smaller the zeta potential the less repulsion and accordingly the greater the agglomeration and flocculation. In the case of most of the constituents of saponified tall oil suspended in "black liquor" the particles are surrounded by negative ions and have a tendency to migrate toward a positive potential. As with all charged particles, the colloids in black liquor will migrate to the oppositely charged electrode at a transfer volocity proportionate to the magnitude of the charge and the applied field.

The embodiment of the invention in FIG. 1 uses these phenomena advantageously by using the conductors 20, 24 to produce a field gradient whose potential exceeds the potential required to induce the decomposition of water; for example, between 20 and 150 volts. The field gradient is applied in line such that the direction of fluid flow is in direct opposition to the ionic mass transfer induced by the applied field. That is, in the region between the upstream and downstream zones, the fluid moves through conduit 12 in a direction opposite to the direction in which the colloid particles would tend to migrate i.e. between the conductors under the influence of the applied field. This reduces the current density which would otherwise be required to induce electrolytic polarizations and increased the relative colloid concentration between the conductors. For example, as shown in FIG. 1, as the black liquor flows through the first conductor 20, the tall oil soap particles suspended in the liquor are attracted toward the conductor surfaces because these particles have a natural anionic tendency, that is, they tend to migrate toward a positive potential. However as the particles enter and pass through openings in the conductor 20, at least some of the particles become, in effect, positively charged. That is, the positive voltage applied to conductors 20 strips a portion of the negative ions from the soap colloids from the outer layer of the colloid (see FIG. 5) thus producing an affinity for negative ions, i.e. producing "holes". Other minute soap colloids, from which anions have not been stripped or have been less completely stripped, remain surrounded by more of their normal complement of negative ions. The particles that still retain all or nearly all of their anions share these anions with the holes. In this way a multitude of soap colloids are allocated and bound to one another to form larger particles and ultimately globules. The particles then move with the black liquor through the conductors and the insulator section 18 into the second conductor 24. In addition, the particles that have not been stripped are repelled by the second conductor 24 and attracted by the positive conductor 20 so that they tend to move against the flow of black liquor in the region between conductors 20 and 24. In so doing these particles encounter the more completely stripped particles and agglomerate with them to form larger globules. As the size of each globule increases, the hydraulic flow of black liquor provides increasing pressure and the more neutralized charge reduces the electric field force so that the globules get carried through the second conductor 24 by the black liquor.

When the particles enter the second conductor 24, any particles still having a net effective positive charge move toward the layers of the negatively charged conductor. Movement of the particles toward the layer walls of conductor 24 causes the particles to contact one another, coalesce and agglomerate. This agglomeration is further enhanced by the fact that any positive charge remaining on the particles is "neutralized" by the negative potential of the second conductor. As the agglomerated particle size increases, the particles, adhering to the conductor walls, are swept and cleaned from the walls by the flow of black liquor through the conductor. Thus the black liquor and agglomerated particles pass from the conduit 12 into tank 14.

Tank 14 may simply be a settling and skimming tank, in which the black liquor resides for a predetermined period of time to allow the agglomerated tall oil soap particles to float to the surface of the liquor wherein they are skimmed off, as for example by mechanically or pneumatically pushing the curdy tall oil soap on the top of the liquor through an opening or discharge orifice 30 formed adjacent the upper edge of the tank.

In a presently preferred embodiment additional concentration and accordingly agglomeration of tall oil soap particles within the black liquor contained in tank 14 is achieved by providing a third conductor 32 within the tank. This conductor, as illustrated in FIG. 1, is formed from a plurality of electrically connected vertically extending rods or wires 34 which are electrically insulated from tank 14 in any convenient manner. For example, wires 34 can be mounted in a frame 36 formed of an insulating material, such as fiberglass or high temperature PVC plastic.

Where tall oil soap is being removed from the liquid flowing through the apparatus, conductor 32 is connected to a positive potential source. The tank itself is electrically connected to ground or to the same negative potential source which is connected to the second conductor 24. By this arrangement, when the neutralized tall oil particles enter the tank with the black liquor, they once again tend to migrate toward the positively charged rods 34 and locally concentrate and accordingly further agglomerate, because of their natural relative anionic potential. As the particles migrate toward the rods, due to increased local concentration, they merge with one another to form large globules of tall oil soap. The larger the globules become the greater their buoyancy is, and they will ascent to the surface of the liquor in the tank more readily.

In order to further improve the agglomeration of the tall oil particles in the black liquor, air is introduced into the flow of black liquor upstream of first conductor 20. The air is introduced from a source (not shown) through a pressure regulator 40 and air flow meter 42 connected in any convenient manner to a nozzle 42 contained within conduit 12. Preferably a static mixer consisting of a series of rigid vanes is placed downstream of the air supply but upstream of first conductor 20. The air and static mixer produce turbulence and small air bubbles in the black liquor which appear to enhance the effectiveness of the charging grids or conductors. It is believed that this improved effectiveness is the result of an increase in the effective charge transfer surface (the minute air bubbles) and the surface exposure of the liquid to the conductors. In addition the minute air bubbles become entrapped in the agglomerated soap particles and thus increase the buoyancy of the globules and their rate of ascent in tank 14. For this same reason and those previously mentioned, it is necessary that the relative potential applied to the various conductors within the system be greater than the decomposition potential of water (i.e. greater than approximately 1.5 volts) and typically about 23 volts for black liquor, so that the flotation of the particles is enhanced by the small quantity of hydrogen and oxygen bubbles resulting from electrolysis of the water in the black liquor. These bubbles also become entrapped in the tall oil soap globules to improve the buoyancy and increase the rate of ascent of the globules in the tank 14.

Although the flow of black liquor through conduit 12 will carry agglomerated particles of tall oil soap with it, it is possible that the conductor grids may at times become clogged with the soap particles or pulp fiber, etc. For this reason a flow control system is provided for backwashing the conductors when necessary. As seen in FIG. 1 flow conduit 12 is provided with pressure gauges 50, 52 at opposite ends of the upstream and downstream zones. At this point, T-connectors 51, 53 are provided which respectively include drain and supply pipes 54, 56 controlled by valves 58, 60. In the normal mode of operation these valves are closed. Conduit 12 is also provided with valves 62, 64 which are normally open. Finally a bypass conduit 66 is provided controlled by a valve 68.

When the pressure differential recorded by gauges 50, 52 reaches a predetermined specific process limit, the operator of the apparatus opens valve 68, closes valves 62, 64 and then opens valves 58 and 60. By opening valve 60 water under pressure from a source (not shown) enters conduit 12 and flows in a reverse direction from the normal flow of the black liquor through conductors 24, 20 and out discharge pipe 54 through valve 58. The black liquor which is continuously supplied from the evaporators or washers simply bypasses the conductors through conduit 66 and enters tank 14. After the desired backwashing time cycle, valves 58 and 60 are closed and valves 62, 64 are opened and valve 68 closed, in that order.

Figure 4:
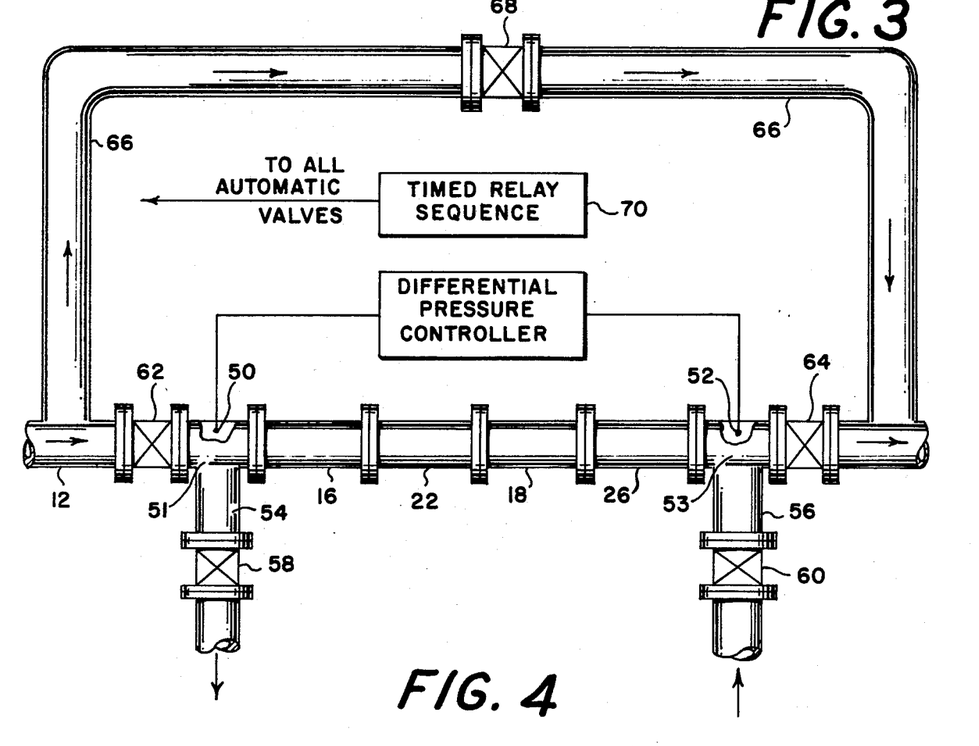
FIG. 4 is a somewhat schematic diagram of a control system used in conjunction with the system of FIG. 1.

In another form of the invention illustrated in FIG. 4, the backwashing control is automated. As seen therein, in lieu of pressure gauges 50, 52 pressure sensors are provided at the juncture of conduit 12 with the T-fittings 51, 53. These pressure sensors are of conventional well known construction and are connected to a conventional pressure controller which monitors the pressure difference between the upstream and downstream sides of the conduit. When the differential pressure controller detects the specified process limit differential pressure it produces a signal directed to a time relay sequencer 70, also of conventional construction, which in turn controls valves 58, 60, 62, 64 and 68 to close valves 62, 64 and open the remainder of the valves in proper sequence to allow for backwashing. Then after a predetermined period of time, sequencer 70 closes valves 58 and 60, reopens valves 62 and 64 and then closes valve 68.

Figure 6:
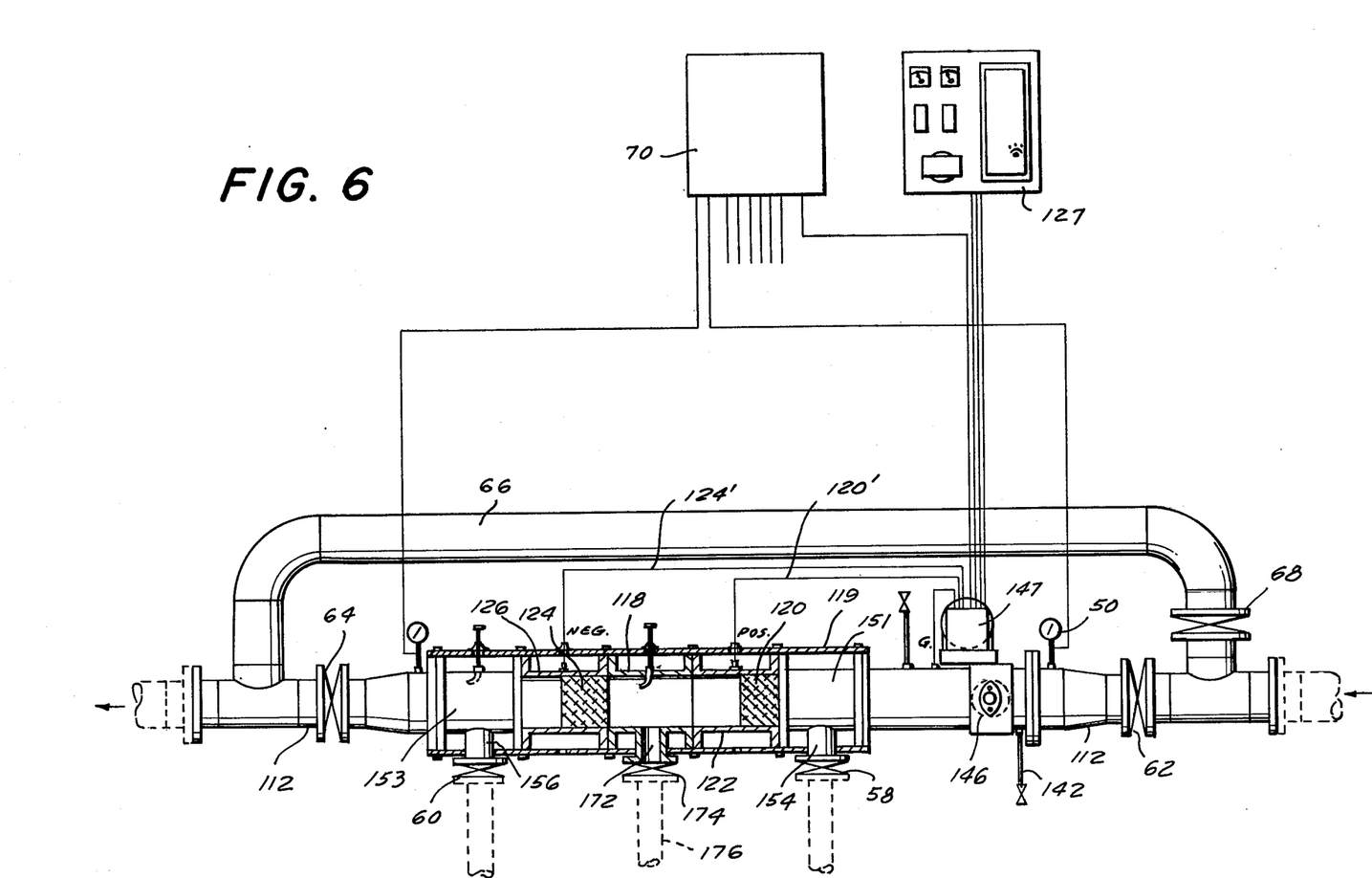
FIG. 6 is a side view, similar to FIG. 4, and with parts broken away for clarity in illustration, of another embodiment of the present invention.

It has been found that in addition to applying a relatively constant potential to the conductors, it is advantageous to apply a pulsating potential to the conductors in the presence of an existing stable electric field, with the result that the DC pulses are more selective as to the electrolysis of the attached ions in the colloids versus the decomposition of the water and other constituents within the liquor. As a result there is assurance that the desired small but steady percentage of soap colloids in the liquor will be stripped of their ions, to produce holes, in order to induce a greater amount of agglomeration of the colloids within the liquor stream. An embodiment of the invention adapted for this process is illustrated in FIG. 6. This apparatus is similar in construction to the apparatus shown in FIG. 1, and only the flow path upstream of the skimming tank is illustrated.

As seen in FIG. 6, the apparatus 100 includes a flow path 112 through the black liquor flows from a source thereof (not shown) to the skimming tank. In this embodiment the flow path or conduit 112 includes a first T connection 151 formed of fiber-reinforced plastic or other suitable insulating material. This T connection electrically insulates the upstream end of a stainless steel tube section 122, which contains grid 120, which is formed in a manner similar to the conductive grid 20 previously described in order to divide the flow path of black liquor into a plurality of small streams flowing through the passages provided in the grid. The black liquor flows from the tube 122 to a second T member 118 formed, like the T member 151, of an electrically non-conductive or insulating material such as for example fiber-reinforced plastic which serves to electrically isolate the upstream conductor 122 from the conductor 124, which is located downstream of the T 118. The latter conductor is contained within another pipe section 126 formed of stainless steel or the like. The black liquor flows from this conductor through a third T 153, formed of an electrically insulating material, to the remainder of the conduit 112, for passage to the skimming tank. Both the upstream and downstream extremities of the conduit 112 are electrically connected to ground. The entire assembly of the T's 151, 118, 153 and conduit sections 122, 126 is surrounded by a fiberglass cover, or tube, 119, to electrically shield the tubes 122, 126 and thus the conductors 120, 124. These conductors are connected by lines 120', 124', respectively, to a junction box 125 which in turn is electrically connected to a control panel 127. The control panel comprises the power supply to the conductors 120, 124 and consists of a constant current source, which applies the relatively stable DC base voltage to the conductors 120, 124 and, in accordance with an important aspect of the embodiment of the invention in FIG. 6, also applies a pulsating voltage to each of these conductors.

Figure 7:
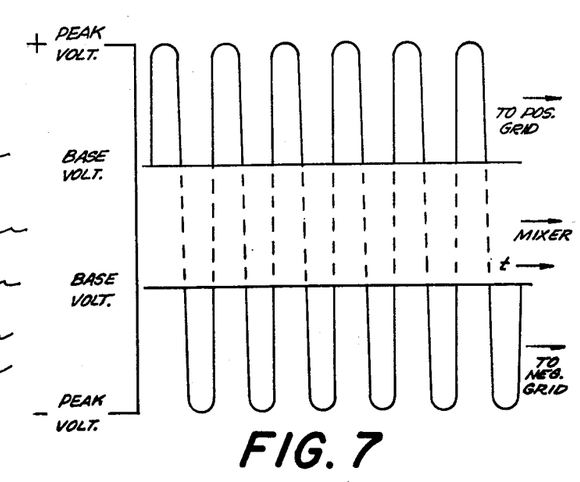
FIG. 7 is a diagram illustrating the electrical potentials applied to the conductors of the device shown in FIG. 6.

FIG. 7 illustrates the power supply to the conductor. As seen therein, each of the conductors has a base voltage applied to it, which is relatively steady and is determined by the constant current source. As previously mentioned this base voltage consists of DC voltage of approximately plus or minus 20 volts to plus or minus 150 volts relative to ground, which may be considered to be at a potential of 0 volts. The piping and components upstream of the T 151 and downstream of the T 153 is at ground potential. This means that the system has three electric fields: conductor 120 to ground, conductor 124 to ground, and conductor 120 to conductor 124. The base voltage, as controlled by the constant current power supply, maintains a relatively constant current density of for example 1–3 amps per cross-sectional square inch, assuming a ten gallon per minute flow per cross-sectional square inch of black liquor through the conduit 112, regardless of the fluctuations in fluid conductivity. In addition to this output, the control power supply unit may be capable of producing a variable frequency pulse train of variable magnitude having peak voltages of, for example, between 100 and 280 volts, applied to the respective conductors or grids to make the positive conductor more positive and the negative conductor more negative, respectively, for the duration of each pulse. The positive and negative pulses may be applied to the respective positively and negatively based conductors 122, 124 simultaneously or alternately. For black liquor, it has been found that approximately 120 pulses per second at plus or minus 280 volts respectively relative to ground and having a duty cycle of about 10% to 20% produces satisfactory results. The power supply unit, used with the present invention to supply the stable DC base voltage and the pulsating positive and negative voltages to the respective conductor 120, 124 can take any convenient form, as would appear to those skilled in the art, however one such apparatus can be for example a power supply unit identified as Model 60544 sold by Research Inc. of Minneapolis, Minnesota.

In order to increase the relative percentage of colloids being affected, a high degree of turbulence is introduced into the system of this embodiment of the invention via a violent in-line agitator, in a manner similar to that of the prevìsouly described embodiment. In this case however the agitator 146 consists of a rotating beater element mounted within the conduit 112 and driven by a motor 147 at a relatively high rate of speed of rotation, for example 2000RPM. The beater element may resemble a single-hoop egg beater. In order to further increase the turbulence in the liquor flowing through the conduit, and to increase the overall surface area exposed to the grid, while at the same time enhancing flotation, air is introduced into the conduit upstream of the beater 146 through an air supply conduit 142 or the like. The air is supplied at the rate of approximately ten standard cubic feet per hour per 100 gpm flow through the conduit.

The agitation of the liquid and the air bubbles produced therein as a result of the introduction of air and the electrolysis of the water, aids in cleaning agglomerate film off the surface of the conductors or grids. If this film were not continuously mechanically cleaned from the conductors in this manner, and were left in a static situation, it would inhibit additional electrical transfer between the colloids, and defeat any tendency for agglomeration. Therefore the agitation of the liquid and the introduction of air thereto provides synergistic effect, in that it not only increases the electrical transfer between the conductors in the colloids, but also keeps the conductors clean.

The system illustrated in FIG. 6 also includes an automatic backwash control system, which is similar to the automatic backwash arrangement illustrated and described with respect to the embodiment of FIG. 1 thereof. The T 153 has a short pipe 156 connected to a valve 60 to control the flow of wash water into what is normally the output end of the flow path 112. The T 118 has a short pipe 172 connected through a valve 174 to a pipe 176 through which wash water can leave the system after having cleansed the conductor 124. The T 151 has a pipe 54 connected to a valve 58 through which wash water can also leave the system after having cleansed the conductor 120.

In order not to impede the continuance of the process, after having opened valve 68 and closed valves 62 and 69, in that order, the valves 60 and 174 are preferably opened first and the valve 58 is kept closed so that wash water entering the pipe 156 and passing through the conductor 124 will emerge directly through the pipe 172, the valve 184, and the pipe 176. After the conductor 124 has been cleansed by this reverse flow of the wash water, the valve 174 may be closed and the valve 58 opened to allow the wash water to flow in the reverse direction through openings in the conductor 120 as well as the conductor 124. During the washing process, the valve 68 in the by-pass conduit 66 is kept open to allow the black liquor to flow around the electrical components in the flow path 112.

It has been found that optimum stripping of tall oil soap colloidal particles occurs when 16% of the particles have anions stripped from them by the electric fields. The remaining approximately 84% are not affected and thus are oppositely charged. It is thought that several of the latter particles can agglomerate with each stripped particle. If the voltage, current, and flow-rate conditions are such that anions are stripped from too many particles, there apparently are not enough unaffected particles to agglomerate with them, and the efficiency of agglomeration drops off under such conditions. Since it is the agglomeration of individual colloidal particles into clumps that facilitates their movement through the liquid in the tank 14 of FIG. 1, the voltage conditions that favor optimum stripping are most desirable.

It may be difficult to maintain optimum voltage conditions to strip anions from a selected percentage of the particles that pass through the openings in the conductors 120, 124. If so, some of the incoming black liquor may be diverted through the pipe 66 by opening the valve 68 enough to allow particles having the original value zeta potential to by-pass the electrical stripping fields but to mingle with the excessively stripped colloidal particles as they enter the tank 14. This has been found to produce good agglomeration efficiency. Another alternative is to connect the pipe 176 to the source of incoming black liquor to inject collodial particles directly into the region of greatest numbers of stripped particles.

EXAMPLE 1

In a black liquor supply at 165° F. having 27.4% of black liquor solids, and a conductivity of 146,000 μmhos, and an initial tall oil availability value of 1.78% of black liquor solids, was passed through the apparatus of FIG. 6, at a flow rate of 250 gallons per minute and subjected to a base voltage of 23 volts at the conductors 120, 124, and a current density of 1.3 amps RMS per cross-sectional square inch, and to a superimposed pulsating voltage having a maximum value of 150 volts. When the liquor was subjected in the apparatus to the field including the base voltage and the pulsating pontential, as well as the agitator 146 and air supplied through the conduit 142, the residual tall oil value was 0.36%, when the liquor was subjected only to the air and the agitator, the residual tall oil value was 0.67%; when the liquor was subjected to only the agitator and the electric field, the residual tall oil value was 0.48%; and when the liquor was subjected to the potential field only, the residual tall oil value was 0.51%.

EXAMPLE 2

A second sample of black liquor at 159° F, having 24.8% black liquor solids content and a conductivity of 137,000 μmhos, and an initial tall oil availability of 1.84% of black liquor solids, was subjected to the same conditions as in the prior example. When the liquor was subjected to the air, agitator and the potential field, the residual tall oil value was 0.39%; when subjected only to the air in the agitator the residual tall oil value was 0.66% when subjected to only the agitator and the full potential field (DC base and pulsation), the residual tall oil value was 0.53% and when subjected to the potential field only, the tall oil residual value was 0.56%.

EXAMPLE 3

A third sample of black liquor at 164° F. having 25.7% black liquor solids content, a conductivity of 129,000 μmhos, and an initial tall oil availability of 2.75% of black liquor solids, was subjected to the same conditions as in the prior examples. When the liquor was subjected to the air, agitator, and the full field, including pulsation, the residual tall oil value was 0.38% of black liquor solids; when subjected to all of the above except the pulsation of the potential field, the tall oil residual value was 0.51%.

Figure 8:
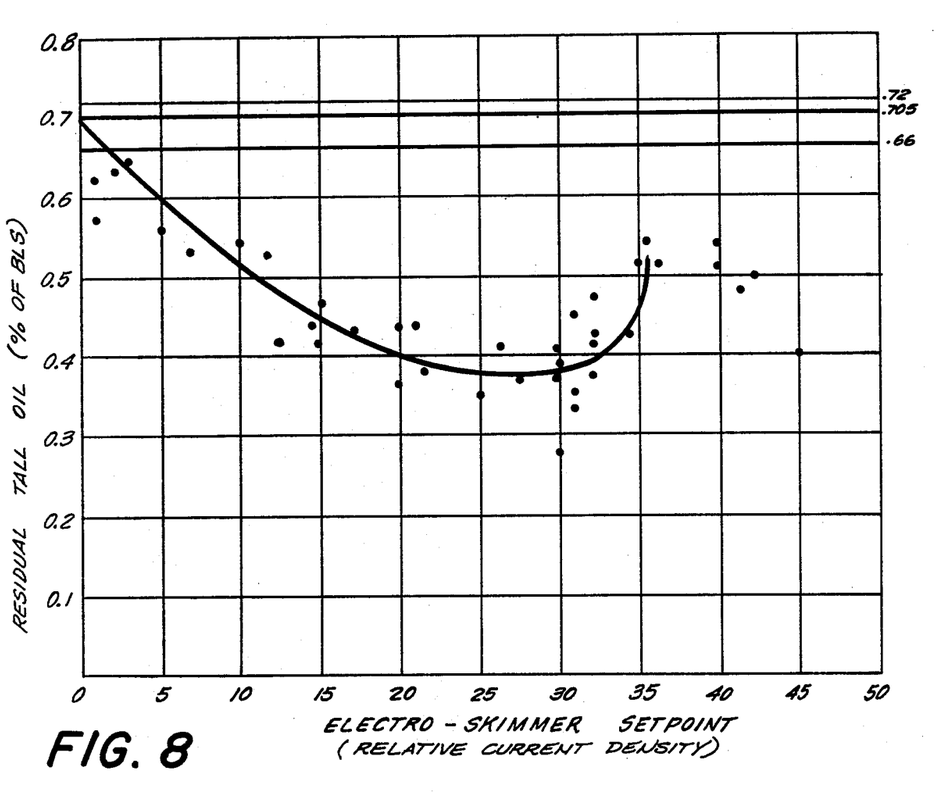
FIG. 8 is a chart plotting residual tall oil against constant current value applied to the conductors used in the apparatus of the present invention.

From these results, it is clear that the combination of a constant base field and the sporadic, more intense high voltage field, is more effective than any of the components alone and that each of the other components also contribute to the overall improved performance of the system. The specific values of the base voltage and the sporadic pulsating high voltage field, are empirically determined according to the liquor or material being subjected to the process of the invention. FIG. 8 represents a graph showng the variation in the residual tall oil contents of black liquor after skimming while using the electro-skimmer at various current density set points. Also indicated on the graph is the base line residual tall oil content of the black liquor after skimming without the use of the electro-skimmer. In both cases it should be noted that the average incoming tall oil availability was 2.11% of the black liquor solids. The electro-skimmer set points represent the current supplied to the conductors 120, 124 in a pipe having a diameter of 5¾ inches. From this chart it is seen that the optimum current supply applied to the pipe, is between 26 and 31 RMS amps.

It has been found that by the method and apparatus of the present invention the amount of tall oil soap recovered from black liquor is as much as 10% to 30% greater as compared to simple conventional skimming techniques (depending on liquor composition and other factors). In view of the current price of tall oil soap this increase represents a substantial economic gain by the use of the invention. For example, tall oil produced in the south-eastern part of the United States currently sells for about $165 per ton. About 3000 pounds of black liquor solids of which a portion is tall oil soap (typically 1–8%) are produced per ton of processed pulp. Prior to this invention approximately 0.7% of the total black liquor solids which are tall oil soap was lost, but, as shown in FIG. 8, the present invention permits this loss to be reduced to 0.4% or even less. Thus, there is a saving of 0.3% or even more. Multiplying 0.3%, or 0.003, times 3000 pounds shows that 9 pounds of tall oil are saved per ton of pulp processed. A paper mill producing 1000 tons of pulp per day—a reasonable quantity—would produce an extra 9000 pounds, or 4.5 tons, of tall oil using this invention. Paper mills operate practically continuously, so, on the basis of 360 days per year, such a mill would produce over 1600 extra tons of tall oil per year. At $165 per ton, that is over $264,000 per year from tall oil that, but for this invention, would be lost.

It has been found that for treatment of black liquor according to the present invention the liquor should preferably be at a temperature between 135° and 180° F. in order to obtain the optimum additional agglomeration of tall oil soap particles, as well as the alkali concentration of the black liquor, at 30% BLS, should be between 0.08 to 0.22% as $Na_2O$ for optimum performance.

As previously mentioned, although the preferred embodiment of the present invention is directed towards the recovery of tall oil soap from black liquor, the process of the invention is also suitable for use in the recovery of other colloidal materials and/or particulate or fibrous suspensions in liquids which exhibit a relative potential or colloidal charge, e.g. cationic or anionic resins or various organic and inorganic floc. More specifically the process may be used to improve alum or monocalcium phosphate efficiencies in removing color from water or sugar juices, and induce fiber flocculation and zeta potential control for pulp and paper processing. The use of the pulsating potential in the embodiment of FIG. 8 has the further advantage of reducing degradation of the conductors. The pulsating potential places a demand on the fluid to conduct at the same rate as the conductors. At the high voltage the ions in the liquid have a greater resistivity and as a result an increased concentration of cations and anions occurs at the conductors since they cannot migrate as fast as the relative demand. The cations and anions at these higher concentrations then act as extensions of the conductors and prevent their electrolytic decomposition or degradation. Accordingly this also reduces the tendency for collodial coating build up on the conductors themselves.

Although an illustrative embodiment of the present invention has been described herein with reference to the accompanying drawings, it is to be understood that the invention is not limited to that precise embodiment, and that various changes and modifications may be effected therein by one skilled in the art without departing from the scope or spirit of this invention.

What is claimed is:

1. In a system for removing particles from a liquid wherein the particles are of a type which receive an electrical charge in the liquid, the combination of, means providing a flow path for a stream of the liquid including an upstream zone and a downstream zone; electrical isolation means for insulating said upstream zone from said downstream zone, a first electrical conductor in said flow path at said upstream zone, a second electrical conductor in said flow path at said downstream zone, and means for connecting the positive side of a direct current source to said first electrical conductor and for connecting the negative side of said source to said second electrical conductor, whereby the particles in said stream receive a positive electrical charge when passing through said upstream zone, agglomerate when passing toward and to said downstream zone, and discharge electrical charges to said second electrical conductor.

2. A system as described in claim 1 wherein each of said electrical conductors comprises an array of grids which form a multiplicity of flow paths, whereby said stream of liquid is divided into a large number of flow paths when passing through said upstream and downstream zones.

3. A system as described in claim 2 wherein said means forming said flow path comprises, a plurality of pipe sections comprising first and third pipe sections defining said upstream zone and said downstream zone, respectively, and a second pipe section positioned therebetween, said first and third sections being formed of non-conducting, high-temperature resistant material.

4. A system as described in claim 3 which includes, means for supplying a stream of air into said stream of liquid flowing to said upstream zone, and mixer means in the path of the air being discharged into said stream of liquid and adapted for separating the air into bubbles in said stream of liquid.

5. A system as described in claim 4 which includes, bypass means having a normally closed valve therein and connected to said means for providing a flow path for carrying said stream of liquid when said valve is open, first and second valve means which are normally open and which are closed to prevent the flow of liquid to said upstream zone and form said downstream zone, respectively, and means to supply a second stream of liquid to the downstream side of said downstream zone and to discharge said second stream of liquid upstream from said upstream zone.

6. A system as described in claim 1 which includes a separation tank into which said stream of liquid flows from said downstream zone and within which the agglomerated particles separate from the liquid by the action of gravity, and means providing separate flow paths from said tank for the liquid and for the agglomerated particles.

7. A system as defined in claim 1 including means for applying a pulsating positive electrical potential to said electrical conductor in said upstream zone and a pulsating negative electrical potential to said downstream zone.

8. A system as defined in claim 7 wherein said means providing a flow path includes electrical insulator conduits respectively located immediately upstream and downstream of said first and second electrical conductors.

9. A system as defined in claim 7 wherein said direct current source comprises means for applying relatively constant positive and negative voltage values to said first and second conductors respectively.

10. A system as defined in claim 7 including means located in said flow path of the liquid for upstream of said first conductors for agitating said liquid.

11. A system for removing suspended materials from a liquid comprising means for providing a flow path for said liquid, said flow path including upstream and downstream zones; first and second electrical conductors respectively located in said upstream and downstream zones and insultated from each other and from adjacent parts of said system; and means for applying opposite electrical potentials to said first and second conductors, wherein particles in said liquid having a relative potential opposite to the potential of said first conductors will migrate toward the first conductor as the liquid flows through said upstream zone and then agglomerate with others of said particles as the liquid carries said particles along said path.

12. A system as defined in claim 11 wherein said first and second conductors each comprises a body formed of a plurality of electrically conductive sheets of corrugated material operatively connected to each other to form a plurality of flow passages therebetween.

13. A system as defined in claim 11 including means for supplying a stream of air into said flow path upstream of said first conductor.

14. A system as defined in claim 13 including means located between said air supplying means and said first conductor for producing turbulence in the liquid and creating a plurality of minute air bubbles in the liquid.

15. A system as defined in claim 11 including a tank operatively connected to said flow path for receiving the liquid and agglomerated particles from said downstream zone, said tank having the same electrical potential as the second conductor including a third conductor therein electrically isolated from the tank and having the same electrical potential as said first conductor, whereby the agglomerated particles are attracted to said conductor and further agglomerate with each other.

16. A system as defined in claim 15 wherein said third conductor comprises a plurality of vertically extending conductor wires.

17. A system as defined in claim 15 wherein the electrical potential applied to said third conductor is greater than the decomposition potential of water.

18. A system as defined in claim 11 wherein said conductors each comprises a plurality of spaced graphite sheets.

19. A system as defined in claim 11 wherein the potential difference between said conductors is greater than the decomposition potential of water.

20. A system as defined in claim 11 including said means for applying opposite electrical potentials to said first and second conductors comprise means for applying a relatively constant electrical potential and a superimposed pulsating electrical potential of the same polarity.

21. A system as defined in claim 20 wherein the electrical potentials applied to said first conductor are positive and the electrical potentials applied to said second conductor are negative.

22. A system as defined in claim 21 wherein said means providing a flow path includes electrical insulator conduits respectively located immediately upstream and downstream of said first and second electrical conductors.

23. A system for removing tall oil soap particles from the black liquor formed in wood pulping processes comprising an elongated conduit providing a flow path for the black liquor including sections formed of an electrical insulator material separating said flow path into upstream and downstream zones; first and second electrical conductors respectively located in said upstream and downstream zones and supported by said insulator material; and means for applying a positive electrical potential to said first conductor and a negative potential to said second conductor whereby the anionic tall oil soap particles in said fluid migrate toward the first conductor as liquid flows through said upstream zone and anions are stripped therefrom and the resulting stripped particles then pass with the liquid to said downstream zone wherein a large portion of the stripped particles is attracted to unaffected particles and accordingly agglomerate and a smaller portion of said stripped particles is attracted to the negatively charged second conductor and their excess positive charge is neutralized and additionally agglomerate one another.

24. A system as defined in claim 23 including a tank for receiving liquid flowing from said downstream zone in which the agglomerated particles of tall oil soap float to the surface of the liquid for removal.

25. A system as defined in claim 24 including a third conductor located in said tank and being electrically isolated therefrom; said third conductor being operatively connected to said means for applying a positive electrical potential whereby tall oil soap particles in the tank are attached to the third conductor, further agglomerate with each other and float to the surface of liquid in the tank.

26. A system as defined in claim 25 including means for applying a stream of air into said flow path upstream of said first conductor.

27. A system as defined in claim 26 including means located between said air supplying means and said first conductor for producing turbulence in the liquid and creating a plurality of minute air bubbles in the liquid whereby said bubbles become entrapped in the agglomerated particles of soap and increase the buoyancy of the agglomerated particles to assist their floating to the surface of liquid in said tank.

28. A system as defined in claim 23 wherein said first and second conductors each comprise a body formed of a plurality of electrically conductive sheets of corrugated material operatively connected to each other to form a plurality of flow passages therebetween.

29. A system as defined in claim 25 wherein said third conductor comprises a plurality of vertically extending conductor wires.

30. A system as defined in claim 25 wherein the electrical potential applied between said first and second conductors is greater than the decomposition potential of water.

31. A system as defined in claim 23 including means for applying a pulsating positive electrical potential to said first electrical conductor in said upstream zone and a pulsating negative electrical potential to said second electrical conductor in said downstream zone.

32. A system as defined in claim 23 wherein said means providing a flow path includes electrical insulator conduits respectively located immediately upstream and downstream of said first and second electrical conductors and electrically grounded conduit means upstream and downstream of said insulator conduits, respectively.

33. A system as defined in claim 32 said means for applying a positive and negative potential to said conductors comprises a constant current source applying constant positive and negative voltage values to said first and second conductors, respectively, relative to said grounded conduit means.

34. A system as defined in claim 23 comprising bypass means connecting said grounded conduit means in said upstream zone to said grounded conduit means in said downstream zone to provide a by-pass path for said colloidal particles separate from said flow path to permit a controlled amount of said colloidal particles to mingle with said particles in said flow path downstream of said second electrical conductor.

35. A system as defined in claim 23 comprising piping means connected at one end to a source of said black liquor and connected at the other end to said flow path between said first and second conductors to inject a controlled quantity of said black liquor into said flow path to cause colloidal particles in said controlled quantity of black liquor to mingle with colloidal particles that have passed through said first conductor but have not yet reached said second conductor.

36. In a system for agglomerating particles in a liquid, the combination of, means for providing a flow path for a stream of liquid including an upstream zone and a downstream zone, means in each of said zones for dividing the stream of liquid therein into a plurality of smaller streams, said dividing means each being formed of an electrically conductive material, said means providing a flow path including an electrically insulated section separating said upstream and downstream zones; means for applying positive potential to one of said conductors, negative potential to the other, a positive pulsating potential to said one conductor and a negative pulsating potential to said other conductor.

37. A system as defined in claim 36 wherein said means for applying said potential include a constant current source.

* * * * *